April 24, 1951     D. E. HERVEY ET AL     2,549,810
METHOD OF AND APPARATUS FOR FORMING TUBULAR
ARTICLES FROM LAMINATED MATERIALS
Filed Oct. 31, 1945     2 Sheets-Sheet 1
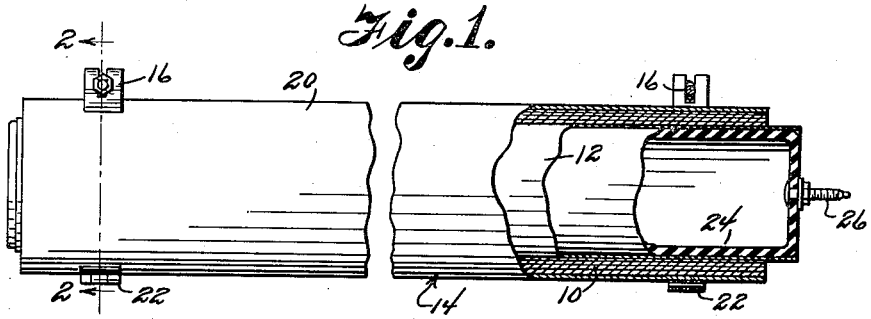
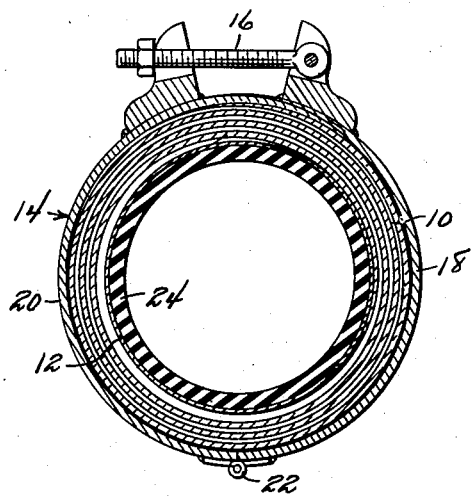
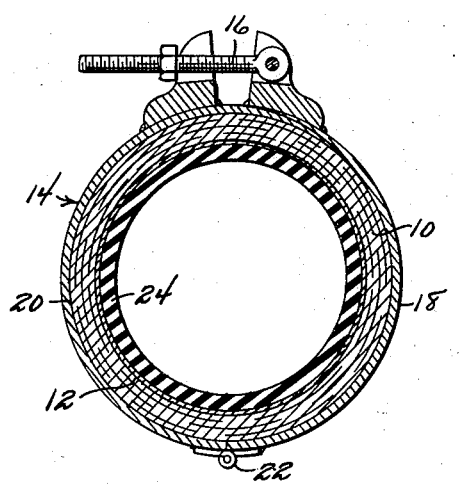
INVENTORS
David E. Hervey
Robert W. Hervey April 24, 1951  D. E. HERVEY ET AL  2,549,810
METHOD OF AND APPARATUS FOR FORMING TUBULAR
ARTICLES FROM LAMINATED MATERIALS
Filed Oct. 31, 1945  2 Sheets-Sheet 2
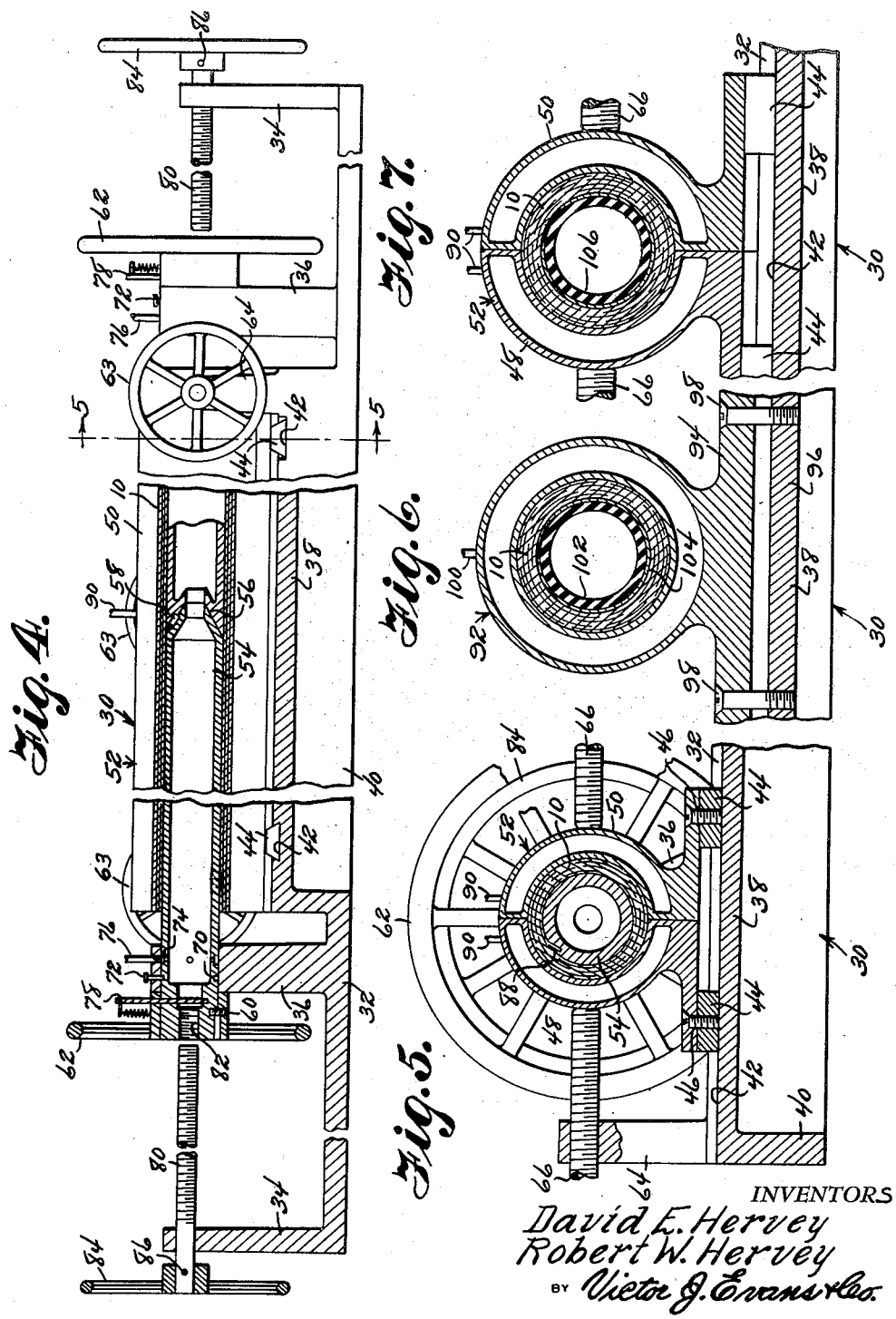
INVENTORS
David E. Hervey
Robert W. Hervey
BY Victor J. Evans & Co.
ATTORNEYS Patented Apr. 24, 1951

2,549,810

UNITED STATES PATENT OFFICE 2,549,810

METHOD OF AND APPARATUS FOR FORMING TUBULAR ARTICLES FROM LAMINATED MATERIALS

David E. Hervey and Robert W. Hervey, Old Fort, N. C.

Application October 31, 1945, Serial No. 625,766

3 Claims. (Cl. 154—83)

This invention relates to an apparatus and method of forming articles from plywood and laminated materials.

Heretofore tubes or tubing that have been formed from plywood have consisted of either one complete revolution of the plywood with the two edges butted up against each other or where several thicknesses of the plywood are joined together, each layer is a separate piece and is bent around the preceding one and the surfaces are glued together.

The surfaces of the respective pieces of this old method are not moved sidewise or lengthwise during the laying up process, and each piece of plywood applied requires a separate laying up process.

An object of this invention therefore is to provide a method for making tubing and other articles wherein one piece of plywood or laminated material makes more than one complete revolution and the face of one portion of the piece of plywood is glued to the face of another portion of the same piece.

It is to be understood that this structure when completed need not be circular in cross-section but could be any number of shapes or sizes made up of many longitudinal sections.

In some instances when the method is employed the plywood or laminated material needs to be lapped over on itself only a very short distance while in others the plywood or laminated material may consist of several layers wrapped over upon themselves two, three or more times.

One of the chief advantages of this invention is that prefabricated sheets which do not shrink or swell appreciably, which are flat and free from buckles, which are strong and not apt to break in handling, which may make use of low grade and low price materials, and which will often reduce other costs of construction, may be made directly into the finished product by multiple wrapping and by drawing these wrappings tight by turning one or both, the cover placed over the wrappings or the core, over which the wrappings are formed and thereby providing a substantial bond in one simple operation.

With the above and other objects and advantages in view, the invention consists of the novel details of construction, arrangement and combination of parts more fully hereinafter described, claimed and illustrated in the accompanying drawings in which Figure 1 is an elevational view of a device used in carrying out the method of forming the tubing shown, partly in section and partly broken away.

Figure 2 is a sectional view on the line 2—2 of Figure 1 with the tubing in loosely wrapped formation.

Figure 3 is the same after pressure has been applied to the tubing to form and bind it into a unitary structure.

Figure 4 is a sectional view of another form of device for carrying out the method.

Figure 5 is a sectional view on the line 5—5 of Figure 4.

Figure 6 is a sectional view of a device wherein internal pressure is used to form the tubing and Figure 7 is a sectional view of a device wherein both internal and external pressure is used to form the tubing.

In carrying out the method embodying the invention as shown in Figures 1 to 3 inclusive, where exact inside dimensions are desirable, the plywood or laminated material 10 after it has had adhesive applied to one or both faces thereof is wrapped around a longitudinally split core 12 in a counter-clockwise manner until it is all wrapped on the core 12 and upon itself to provide a bond between the surfaces. To provide maximum retention of adhesive it should be wrapped loosely at first as shown in Figure 2. In order to provide a better bond and eliminate any voids that might occur in the wrapping process a longitudinally split cover or outside sectional tubular casing 14 is positioned on the outer surface of the plywood 10 and is gradually diminished in size, while the core and material are continuously turned in a counterclockwise or clockwise manner, by means of the tighteners 16, secured to the casing 14 on the opposite surfaces of the free longitudinal edges thereof, and adjacent each end thereof and the sections 18 and 20 of the tubing 14 are connected by hinges 22.

This action brings pressure to bear on the entire outer surface of the plywood 10, causing the surface of each wrapping thereof to move, slip or skid with relation to each other.

The cover is retained in position until the adhesive is partially or completely set during which time heat may be applied directly to the material by means of high frequency induction of an electrical current by means not shown.

In order to decrease the time necessary for the adhesive to bond the layers, the cover and the core may be formed as the two electrodes of a high frequency heating unit to heat and set the adhesive by induction. This apparatus is not shown in the drawings.

Where exact outside dimensions are required or desired the cover or casing 14 is adjusted to the desired dimensions, and the cover though shown tubular in cross section can assume any desired shape, is held in this position while the plywood 10 or laminated material is internally expanded by means of an inflatable bag 24 which is placed interiorly of the longitudinally split core 12 and is inflated by means of the air valve 26, causing internal pressure on the plywood 10 rather than external pressure as previously described, as in the previous method, the internal pressure is retained until the adhesive is partially or completely set.

In carrying out the method shown in Figures 4 and 5, the apparatus 30 is employed. The apparatus comprises an elongated base 32 having vertical ends 34 and diametrically opposed supports 36 formed integral with the base relatively spaced with relation to each other and internally of the ends 34.

The base 32 is provided with a raised platform portion 38 which is integral with the base having the depending sides 40, the platform 38 is provided with grooves 42 transversely thereof to receive the dovetail blocks 44 slidably therein.

Secured to the blocks 44 by means of fasteners 46 are the semi-circular hollow sections 48 and 50 respectively which abut at their inner faces to provide the casing 52.

Mounted for sliding movement in the supports 36 is the sectional mandrel 54, which is keyed together at the joint 56 by means of the key 58. Secured to the outer ends of the mandrel 54 by fasteners 60 are the wheels 62 by means of which the mandrel can be rotated the purpose of which will be later explained.

The platform is provided at its outer sides with diametrically opposed supports 64 which are adapted to threadably receive the pressure screws 66 which are controlled by the wheels 68. The mandrel is provided with circular grooves 70 adjacent to its ends in which the catch or latch 72 engages to retain the mandrel in position in the supports 36, and a second set of grooves 74 internally of the grooves 70 permit steam or other heating mediums to enter the mandrel 54 by means of the inlet pipes 76. A spring pressed slide valve 78 retains the heating medium within the mandrel 54. When it is desired to move the mandrel 54 longitudinally of the casing 52, the screws 80 are threaded into the threaded bores 82 in the ends of the mandrel by means of the wheels 84 secured thereto by pins 86. When the wheels 84 are rotated in the opposite direction the mandrel will be withdrawn from the casing 52. One of the bores 82 is shown in the left side of Figure 4.

When this apparatus is used the end of the plywood 10 is mounted in the longitudinal slot 88 in the mandrel 54, which is then turned to wrap the plywood around the mandrel 54, and the casing is moved to envelope the plywood by means of the pressure screws 66, and the sections of the casing 52 are closed until their inner faces approach or abut while at the same time the mandrel is turned again to wrap the plywood tightly then a heat medium is applied to the mandrel 54, by means of the inlet pipe 76 and to the casing sections 48 and 50 by means of an inlet 90. Thus external pressure, heat and rotary movement of the mandrel is effected to bind the tubing into a unitary structure as previously described.

In Figure 6 a hollow tubular casing 92 is employed having a base 94 secured to a support 96 by means of fasteners 98. In this instance steam is admitted to the casing 92 by the inlet pipe 100 and an inflatable bag 102 is positioned within a core 104 on which the plywood 10 is wrapped.

Thus heat and internal pressure is used in this method of forming the tubing.

In Figure 7 an inflatable bag 106 is employed with the structure previously described in Figures 4 and 5, and include the semi-circular hollow sections 48 and 50, pressure screws 66 and steam inlets 90, the other elements remaining as previously described.

Thus internal and external pressure is employed as well as heat.

Another method in forming the tubing is to employ the structure shown in Figures 1 to 3 and turn the cover while the bag is being inflated, also both core and cover may be rotated in opposite direction.

In order to reduce the size of the pieces of plywood or laminated material and to affect savings in time and labor and to accomplish different forms or thicker walls two or more pieces may be introduced into the apparatus when forming the tubing.

It is believed that the method of the invention and the manner in which it is carried out will be apparent to those skilled in the art and it is to be understood that the forms of apparatus shown and described herein, are merely used for purposes of illustration, since other apparatus may be employed to carry out the method and the invention is only to be limited by the scope of the appended claims.

Having thus described the invention what is claimed as new and desired to be secured by Letters Patent is:

1. The method of forming a hollow integrally molded seamless member which comprises the steps of coating a sheet of material with adhesive on both faces thereof, attaching one edge of the sheet of material to a longitudinally split core, spirally wrapping the sheet of material loosely upon itself and about the core in successive convolutions in contiguous coextensive layers to form a substantially hollow member, enclosing the wrapped material and core in a longitudinally extending casing having a form of desired shape, anchoring the outermost edge of the sheet material to the casing, turning the core and the wrapped sheet of material while holding the casing stationary, applying pressure to the core uniformly against the internal surface of the same simultaneously with the turning of the core to expand the core whereby each layer is caused to move relative to adjacent layers and heating the assembled parts to set the adhesive.

2. The method of forming a hollow integrally moulded seamless member which comprises the steps of coating a sheet of material with adhesive on both faces thereof, spirally wrapping the sheet of material loosely upon itself and about the core in successive convolutions in contiguous coextensive layers to form a substantially hollow member, enclosing the wrapped material and core in a longitudinally extending casing having a form of desired shape, applying pressure uniformly against the innermost layer of the wrapped member to internally expand the same against the casing whereby each layer is caused to move relative to adjacent layers and heating the assembled parts to set the adhesive.

3. In a machine for forming articles comprising in combination, an elongated base, a hollow casing adapted to receive a loosely-wound laminated article, means for heating said casing, an expansible inflatable core means in said casing adapted to support said article therein and when expanded to force the article against said casing and means on said base for rotating said core means.

DAVID E. HERVEY.
ROBERT W. HERVEY.

REFERENCES CITED

The following references are of record in the file of this patent:

UNITED STATES PATENTS

| Number | Name | Date |
|---|---|---|
| 1,284,702 | Kempton | Nov. 12, 1918 |
| 1,504,547 | Egerton | Aug. 12, 1924 |
| 2,059,373 | Lloyd | Nov. 3, 1936 |
| 2,351,692 | Miller | June 20, 1944 |
| 2,402,038 | Goldman et al. | June 11, 1946 |
| 2,406,843 | Luth et al. | Sept. 3, 1946 |
| 2,411,542 | Ilch | Nov. 26, 1946 |
| 2,457,504 | Snoke | Dec. 28, 1948 |